US007867406B2

(12) United States Patent
Albrecht et al.

(10) Patent No.: US 7,867,406 B2
(45) Date of Patent: Jan. 11, 2011

(54) PATTERNED MAGNETIC MEDIA HAVING AN EXCHANGE BRIDGE STRUCTURE CONNECTING ISLANDS

(75) Inventors: Thomas R. Albrecht, San Jose, CA (US); Manfred E. Schabes, Saratoga, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 169 days.

(21) Appl. No.: 11/964,685

(22) Filed: Dec. 26, 2007

(65) Prior Publication Data

US 2009/0169731 A1 Jul. 2, 2009

(51) Int. Cl.
*G11B 5/84* (2006.01)
(52) U.S. Cl. .............................. 216/22; 216/41; 216/44; 216/66; 216/75; 427/127; 427/130; 204/192.34
(58) Field of Classification Search ........................ None
See application file for complete search history.

(56) References Cited

U.S. PATENT DOCUMENTS

| 6,014,296 | A  | * | 1/2000  | Ichihara et al. ............. 360/135 |
| 6,440,589 | B1 | * | 8/2002  | Fullerton et al. ............ 428/826 |
| 6,468,670 | B1 |   | 10/2002 | Ikeda et al. |
| 6,495,252 | B1 |   | 12/2002 | Richter et al. |
| 6,602,620 | B1 |   | 8/2003  | Kikitsu et al. |
| 6,610,602 | B2 | * | 8/2003  | Gambino et al. ............ 438/689 |
| 6,686,070 | B1 | * | 2/2004  | Futamoto et al. ............ 428/827 |
| 6,906,879 | B1 | * | 6/2005  | Albrecht et al. ............... 360/55 |
| 7,097,924 | B2 |   | 8/2006  | Haginoya et al. |
| 7,138,193 | B2 | * | 11/2006 | Rodmacq et al. ............ 428/826 |
| 2005/0079282 | A1 | * | 4/2005 | Jin ........................... 427/126.6 |
| 2005/0122609 | A1 | * | 6/2005 | Albrecht et al. ............... 360/55 |
| 2005/0122612 | A1 | * | 6/2005 | Albrecht et al. ............... 360/59 |
| 2005/0163962 | A1 | * | 7/2005 | Kawato et al. ............. 428/65.3 |
| 2006/0246323 | A1 |   | 11/2006 | Liu et al. |
| 2006/0269797 | A1 | * | 11/2006 | Lu et al. ..................... 428/834 |
| 2006/0286413 | A1 |   | 12/2006 | Liu et al. |
| 2007/0072011 | A1 |   | 3/2007  | Li et al. |

(Continued)

FOREIGN PATENT DOCUMENTS

JP        2004227639        12/2004

(Continued)

OTHER PUBLICATIONS

Moritz, J. et al "Patterned Media made From Pre-Etched Wafers: A Promising Route Toward Ultrahigh-Density Magnetic Recording" IEEE Transactions on Magnetics, 38 (4) 1731-1736, Jul. 2002.*

(Continued)

*Primary Examiner*—Anita K Alanko
(74) *Attorney, Agent, or Firm*—Duft Bornsen & Fishman, LLP

(57) ABSTRACT

Patterned magnetic recording media and associated methods of fabrication are described. The patterned magnetic recording media includes a perpendicular magnetic recording layer that is patterned into a plurality of discrete magnetic islands. The patterned magnetic recording media also includes an exchange bridge structure formed from magnetic material that connects the islands of the perpendicular magnetic recording layer. Connecting the islands with magnetic material increases exchange coupling between the islands, which makes the islands more magnetically stable.

7 Claims, 14 Drawing Sheets

U.S. PATENT DOCUMENTS

| | | | |
|---|---|---|---|
| 2008/0093336 A1* | 4/2008 | Lee et al. | 216/22 |
| 2008/0141523 A1* | 6/2008 | Bandic et al. | 29/603.13 |
| 2008/0292907 A1* | 11/2008 | Berger et al. | 428/828 |
| 2009/0059429 A1* | 3/2009 | Lee et al. | 360/135 |
| 2009/0068500 A1* | 3/2009 | Kong et al. | 428/846.6 |
| 2009/0071935 A1* | 3/2009 | Nam | 216/22 |
| 2009/0135527 A1* | 5/2009 | Lee et al. | 360/314 |

FOREIGN PATENT DOCUMENTS

| | | |
|---|---|---|
| JP | 2006277843 | 10/2006 |
| JP | 2006277844 | 10/2006 |
| WO | 9625734 | 8/1996 |

OTHER PUBLICATIONS

Choe et al., "Perpendicular Recording CoPtCrO Composite Media With Performance Enhancement Capping Layer", IEEE Transactions on Magnetics, vol. 41, No. 10, pp. 3172-3173 (Oct. 2005).

Takanosu et al., "Thermal Stability of an Over Keepered Medium Estimated by Read/Write Simulation", Journal of the Magnetics Society of Japan, vol. 25, No. 4_2, pp. 603-606 (2001).

* cited by examiner

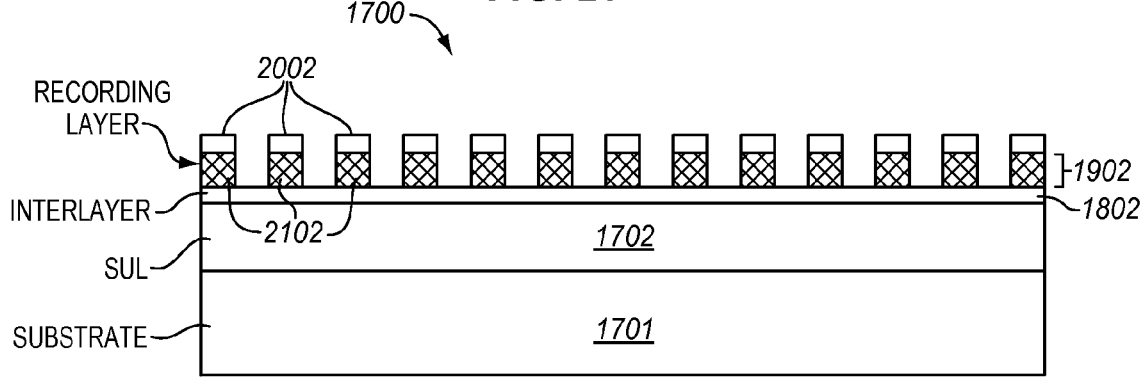
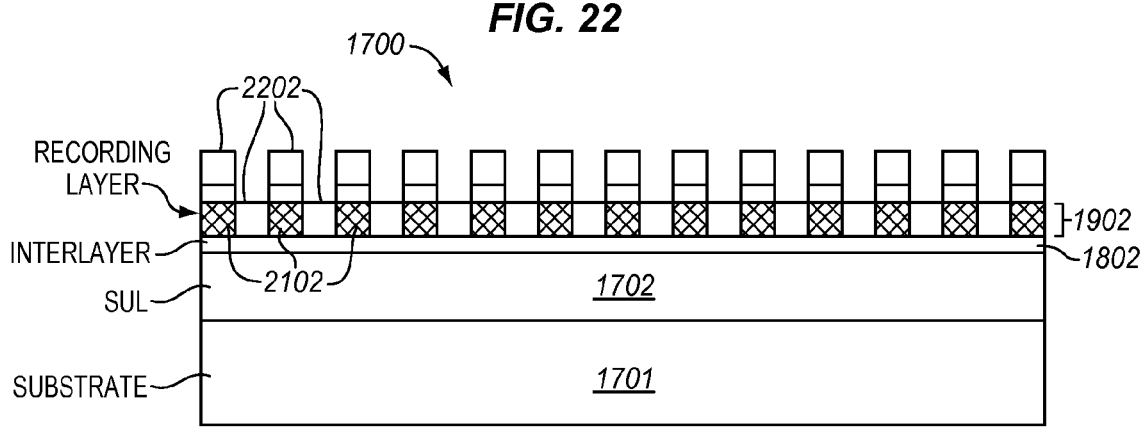
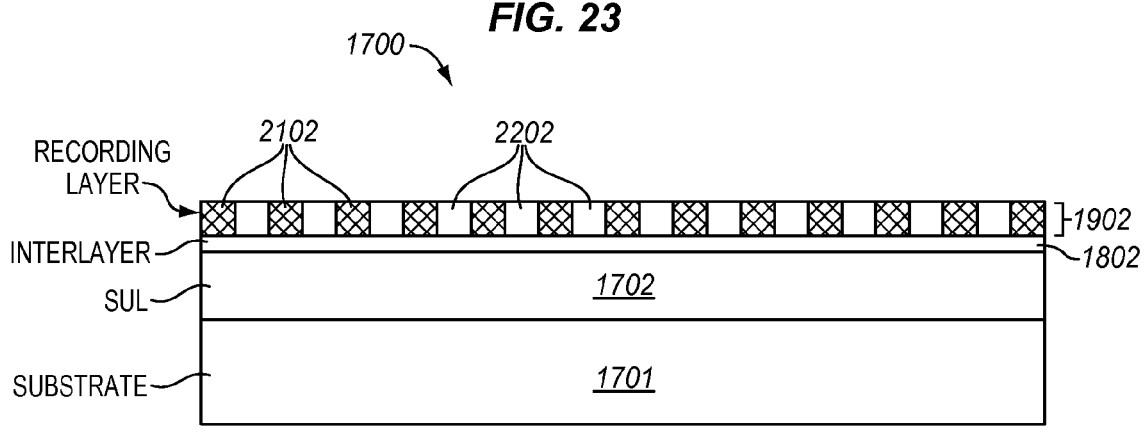

PATTERNED MAGNETIC MEDIA HAVING AN EXCHANGE BRIDGE STRUCTURE CONNECTING ISLANDS

BACKGROUND OF THE INVENTION

1. Field of the Invention

The invention is related to the field of magnetic disk drive systems and, in particular, to patterned magnetic media having an exchange bridge structure connecting the islands of a perpendicular magnetic recording layer.

2. Statement of the Problem

Many computer systems use magnetic disk drives for mass storage of information. Magnetic disk drives typically include one or more magnetic recording heads (sometimes referred to as sliders) that include read elements and write elements. An actuator/suspension arm holds the recording head above a magnetic disk. When the magnetic disk rotates, an air flow generated by the rotation of the magnetic disk causes an air bearing surface (ABS) side of the recording head to ride a particular height above the magnetic disk. The height depends on the shape of the ABS. As the recording head rides on the air bearing, an actuator moves the actuator/suspension arm to position the read element and the write element over selected tracks of the magnetic disk.

One type of magnetic disk presently used in magnetic disk drives provides for longitudinal recording. A magnetic disk for longitudinal recording includes a magnetic recording layer having an easy axis of magnetization parallel to the substrate. The easy axis of magnetization is the crystalline axis that is aligned along the lowest energy direction for the magnetic moment. Another type of magnetic disk provides for perpendicular recording. A magnetic disk for perpendicular recording includes a magnetic recording layer having an easy axis of magnetization oriented substantially perpendicular to the substrate.

A perpendicular magnetic disk is generally formed with a soft magnetic underlayer (SUL), an interlayer, a perpendicular magnetic recording layer, and a protective layer or overcoat for protecting the surface of the perpendicular magnetic recording layer, which are formed on a substrate. The soft magnetic underlayer (SUL) serves to concentrate a magnetic flux emitted from a main pole of a write element and to serve as a flux return path back to a return pole of the write element during recording on the magnetic recording layer. The interlayer serves to control the size of magnetic crystal grains and the orientation of the magnetic crystal grains in the magnetic recording layer. The interlayer also serves to magnetically de-couple the SUL and the magnetic recording layer.

On a longitudinal or perpendicular magnetic disk, the magnetic recording layer is divided into small magnetic regions, each of which is used to encode a single binary unit of information. The magnetic regions include multiple magnetic grains, possibly small in number (10 to 100), which generates a highly localized magnetic field. The write element magnetizes a magnetic region by generating a strong local magnetic field.

As the areal density of magnetic disks increase, the super-paramagnetic effect causes problems for disk manufacturers. The super-paramagnetic effect occurs when the microscopic magnetic grains on the disk become so tiny that ambient temperature can reverse their magnetic orientations. The result is that the bit is erased and the data is lost.

One solution to the problems posed by the super-paramagnetic effect is to pattern the magnetic disk (also referred to as bit patterned recording). A patterned disk is created as an ordered array of highly uniform islands, with each island capable of storing an individual bit. A patterned disk may allow ultra-high density recording to be achieved. Because each island represents an individual magnetic domain, the patterned disk is thermally stable and higher densities may be achieved.

However, the magnetic stability of the islands as well as their switching field distribution may be adversely affected by magnetostatic interaction fields. The adverse effects of magnetostatic interaction fields are a problem especially when the media is patterned with high densities of islands. As the size of the islands decrease with increased density, the width of the write element (i.e., pole tip) also decreases. Smaller pole tips lead to reduced write fields. Thus, the switching field (Hs) of the islands needs to be decreased, which leads to decreased energy barriers against thermal reversal or demagnetization-induced reversal.

The islands on a perpendicular magnetic disk are patterned as discrete magnetic islands, meaning that there is no magnetic material connecting the islands. Although there is no magnetic material connecting the islands, there is still magnetostatic coupling between the islands. Magnetostatic coupling tends to cause antiparallel (AP) coupling between neighboring islands. As the densities increase and the islands are patterned closer together, the magnetostatic coupling between the islands increases. The increase in magnetostatic coupling can de-stabilize the island magnetization.

SUMMARY

Embodiments of the invention solve the above and other related problems by connecting the islands of a patterned magnetic recording media with an exchange bridge structure formed from magnetic material. Connecting the islands with magnetic material increases exchange coupling between the islands. The exchange coupling tends to cause parallel coupling between neighboring islands, which counteracts or offsets the magnetostatic coupling between the islands. The result is that the islands are more magnetically stable against thermal reversal or demagnetization-induced reversal.

One embodiment of the invention comprises a method of fabricating a patterned magnetic recording media. One step of the method includes fabricating a perpendicular magnetic recording layer that is patterned into a plurality of discrete magnetic islands. Another step of the method includes fabricating an exchange bridge structure formed from magnetic material that connects the islands of the perpendicular magnetic recording layer. These steps may be performed in either order. In one example, the exchange bridge structure may be fabricated first, with the perpendicular magnetic recording layer patterned on top of the exchange bridge structure. The exchange bridge structure thus connects the bottoms of the islands of the perpendicular magnetic recording layer. In another example, the perpendicular magnetic recording layer may be patterned first, with the exchange bridge structure fabricated on top of the islands of the perpendicular magnetic recording layer. The exchange bridge structure thus connects the tops of the islands of the perpendicular magnetic recording layer. In yet another example, the perpendicular magnetic recording layer may be patterned first, with the exchange bridge structure fabricated between the islands of the perpendicular magnetic recording layer. The exchange bridge structure thus connects the sides of the islands of the perpendicular magnetic recording layer.

The invention may include other exemplary embodiments described below.

DESCRIPTION OF THE DRAWINGS

The same reference number represents the same element or same type of element on all drawings.

FIG. 21 is a cross-sectional view of a patterned magnetic recording media after an etching process in an exemplary embodiment of the invention.

FIG. 22 is a cross-sectional view of a patterned magnetic recording media with a refill material deposited in an exemplary embodiment of the invention.

FIG. 23 is a cross-sectional view of a patterned magnetic recording media with an etch mask removed in an exemplary embodiment of the invention.

DETAILED DESCRIPTION OF THE INVENTION

Figure 1:
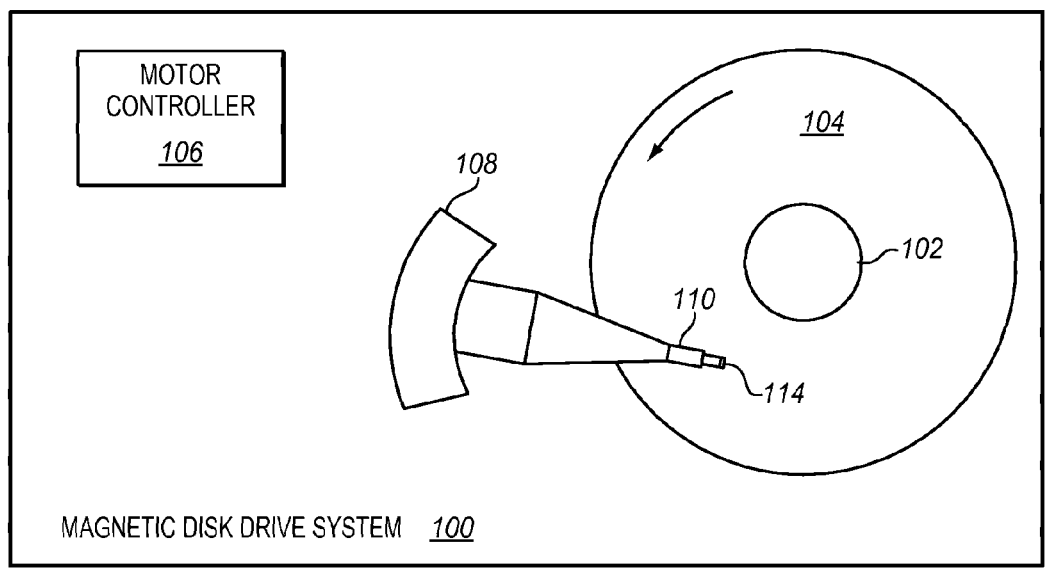
FIG. 1 illustrates a magnetic disk drive system.

FIG. 1 illustrates a magnetic disk drive system 100. Magnetic disk drive system 100 includes a spindle 102, a magnetic recording disk 104, a motor controller 106, an actuator 108, an actuator/suspension arm 110, and a recording head 114. Spindle 102 supports and rotates magnetic recording disk 104 in the direction indicated by the arrow. A spindle motor (not shown) rotates spindle 102 according to control signals from motor controller 106. Recording head 114 is supported by actuator/suspension arm 110. Actuator/suspension arm 110 is connected to actuator 108 that is configured to rotate in order to position recording head 114 over a desired track of magnetic recording disk 104. Magnetic disk drive system 100 may include other devices, components, or systems not shown in FIG. 1. For instance, a plurality of magnetic disks, actuators, actuator/suspension arms, and recording heads may be used.

When magnetic recording disk 104 rotates, an air flow generated by the rotation of magnetic disk 104 causes an air bearing surface (ABS) of recording head 114 to ride on a cushion of air at a particular height above magnetic disk 104. The height depends on the shape of the ABS. As recording head 114 rides on the cushion of air, actuator 108 moves actuator/suspension arm 110 to position a read element (not shown) and a write element (not shown) in recording head 114 over selected tracks of magnetic recording disk 104.

Figure 2:
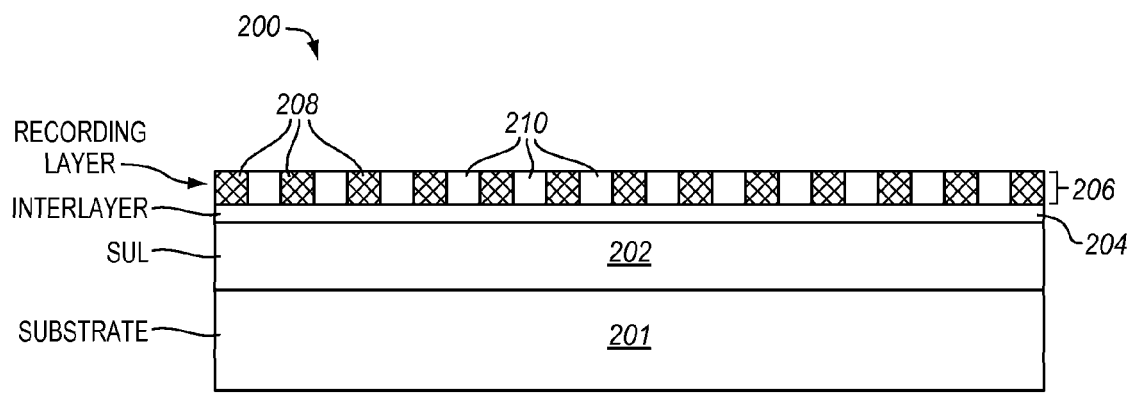
FIG. 2 is a cross-sectional view of a typical patterned magnetic recording media for perpendicular recording.

FIG. 2 is a cross-sectional view of a typical patterned magnetic recording media 200 for perpendicular recording, such as magnetic disk 104. Patterned magnetic recording media 200 includes a soft magnetic underlayer (SUL) 202, an interlayer 204, and a perpendicular magnetic recording layer 206 formed on a substrate 201. Patterned magnetic recording media 200 may include other layers not shown in FIG. 2 for the sake of brevity, such as one or more protective layers or an overcoat formed on perpendicular magnetic recording layer 206, one or more seed layers, one or more layers between SUL 202 and interlayer 204, or one or more layers between interlayer 204 and magnetic recording layer 206, etc.

Perpendicular magnetic recording layer 206 is formed from one or more materials that have an easy axis of magnetization oriented substantially perpendicular to substrate 201. Perpendicular magnetic recording layer 206 may be formed from a Co-alloy and may include elements such as Cr and Pt as well as oxides such as $SiO_2$. Interlayer 204 controls the orientation and grain diameter of the perpendicular magnetic recording layer 206. SUL 202 acts in conjunction with the write element to increase the perpendicular field magnitude and improve the field gradient generated by a recording head passing over magnetic recording media 200. SUL 202 may be a single layer structure formed from materials such as CoFe-TaZr. SUL 202 may alternatively have an antiparallel (AP) structure, where two SULs are antiparallel coupled across an AP coupling layer.

Perpendicular magnetic recording layer 206 is patterned into a plurality of discrete magnetic islands 208. Islands 208 are separated from one another by refill material 210, which is some type of non-magnetic material such as alumina. Although there is no magnetic material connecting islands 208, there is still magnetostatic coupling between islands 208. Magnetostatic coupling tends to cause AP coupling between neighboring islands 208. As densities increase and islands 208 are patterned closer together, the magnetostatic coupling between islands 208 increases. The increase in magnetostatic coupling leads to magnetic instability in islands 208. Improved patterned magnetic recording media and associated methods of fabrication are described below to overcome the problems of magnetostatic coupling.

FIGS. 3-37 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

In the following embodiments of patterned magnetic recording media, a soft magnetic underlayer (SUL) is described as one of the layers used to form the media, as that is common in present technology. However, the patterned magnetic recording media in the following embodiments may include a SUL as described below, may include a substantially thinner SUL or a SUL with significantly less permeability than is presently implemented, or no SUL.

Figure 3:
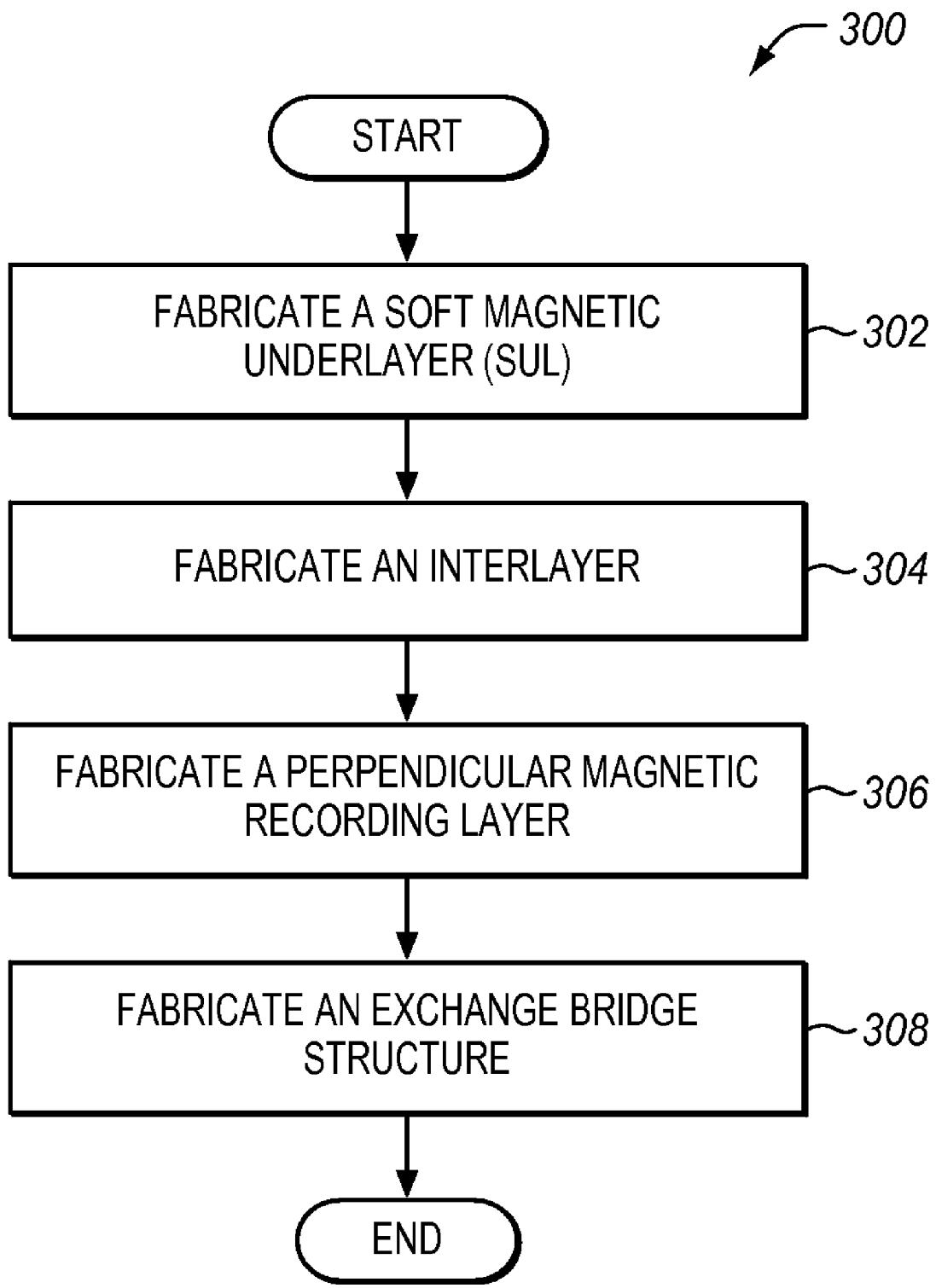
FIG. 3 is a flow chart illustrating a method of fabricating a patterned magnetic recording media in an exemplary embodiment of the invention.

FIG. 3 is a flow chart illustrating a method 300 of fabricating a patterned magnetic recording media in an exemplary embodiment of the invention. Method 300 may be used to fabricate magnetic recording disk 104 as shown in FIG. 1.

Step 302 comprises fabricating a soft magnetic underlayer (SUL) on a substrate. Step 304 comprises fabricating an interlayer on the SUL. Step 306 comprises fabricating a perpendicular magnetic recording layer. The perpendicular magnetic recording layer may be fabricated in a variety of ways. In one example, the material for the layer is deposited, and then is patterned. The perpendicular magnetic recording layer may be patterned by first patterning a master tool using electron beam lithography. An etch layer may then be deposited on the perpendicular magnetic recording layer, which is imprinted with the master tool. An etching process, such as ion beam etching, may then be performed to remove the portions of the perpendicular magnetic recording layer that are exposed by the etch layer. This patterns the perpendicular magnetic recording layer into a plurality of discrete magnetic islands.

In another example, additional substrate material may be deposited before the perpendicular magnetic recording layer. An etch layer may then be deposited on the substrate material, which is imprinted with the master tool. An etching process may then be performed to remove the portions of the substrate material that are exposed by the etch layer. This patterns the substrate material into a plurality of discrete islands. The perpendicular magnetic recording layer is then deposited on top of the patterned substrate material. Those skilled in the art will appreciate that there may be additional ways of patterning a perpendicular magnetic recording layer.

Step 308 comprises fabricating an exchange bridge structure. An exchange bridge structure comprises any structure that connects neighboring islands of a patterned perpendicular magnetic recording layer with magnetic material. The exchange bridge structure increases exchange coupling between the islands. The exchange coupling tends to cause the magnetizations of neighboring islands to align in parallel, which counteracts or offsets the magnetostatic coupling between the islands. As a result, the islands are more magnetically stable against thermal reversal or demagnetization-induced reversal.

The steps of method 300 are not provided in any particular order. As a result, the exchange bridge structure may be fabricated before the perpendicular magnetic recording layer, or after the perpendicular magnetic recording layer. Thus, the exchange bridge structure may be fabricated underneath the perpendicular magnetic recording layer in order to connect the bottoms of the islands. In one alternative, the exchange bridge structure may be fabricated on top of the perpendicular magnetic recording layer in order to connect the tops of the islands. In yet another alternative, the exchange bridge structure may be fabricated in between the islands. Examples of these structures are shown in FIGS. 4-6.

Figure 4:
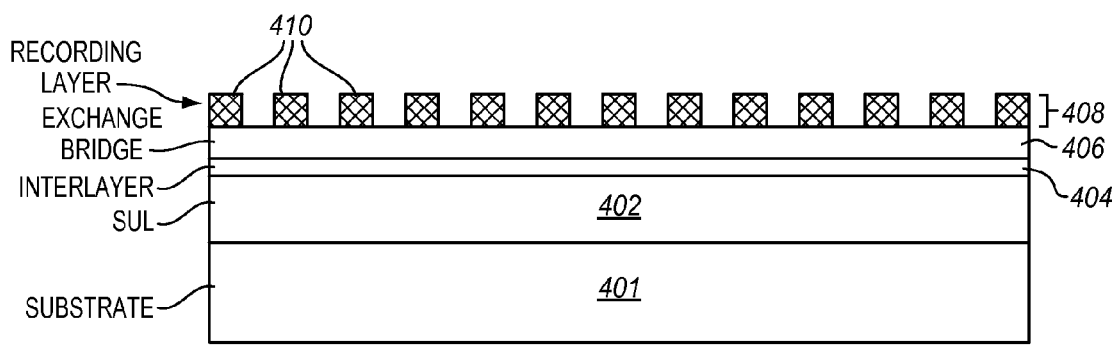
FIG. 4 is a cross-sectional view of a patterned magnetic recording media with an exchange bridge structure fabricated under islands in an exemplary embodiment of the invention.

FIG. 4 is a cross-sectional view of a patterned magnetic recording media 400 with an exchange bridge structure fabricated under the islands in an exemplary embodiment of the invention. Patterned magnetic recording media 400 includes a soft magnetic underlayer (SUL) 402 formed on a substrate 401, with an interlayer 404 formed on SUL 402. Patterned magnetic recording media 400 further includes an exchange bridge structure 406 formed on interlayer 404. Patterned magnetic recording media 400 further includes a perpendicular magnetic recording layer 408 formed on exchange bridge structure 406. Patterned magnetic recording media 400 may include other layers not shown in FIG. 4 for the sake of brevity, such as one or more protective layers formed on perpendicular magnetic recording layer 408, one or more seed layers, one or more layers between SUL 402 and interlayer 404, etc.

Patterned magnetic recording layer 408 is patterned into a plurality of islands 410. Because islands 410 are formed on exchange bridge structure 406, the bottom of islands 410 are connected to one another with magnetic material. Exchange bridge structure 406 provides exchange coupling between islands 410, which counteracts the demagnetization fields from neighboring islands 410. The interaction field can decrease or increase the switching field of an island 410 depending on relative orientation. Exchange bridge structure 406 filters out the switching field fluctuations that are due to magnetostatic coupling. Further, exchange bridge structure 406 connects islands 410 with different intrinsic switching fields (e.g., due to anisotropy fluctuations, moment fluctuations, defects, etc), which helps to smooth these fluctuations. Exchange bridge structure 406 may also allow the use of an increased anisotropy of islands 410 without raising the write field requirement.

Figure 5:
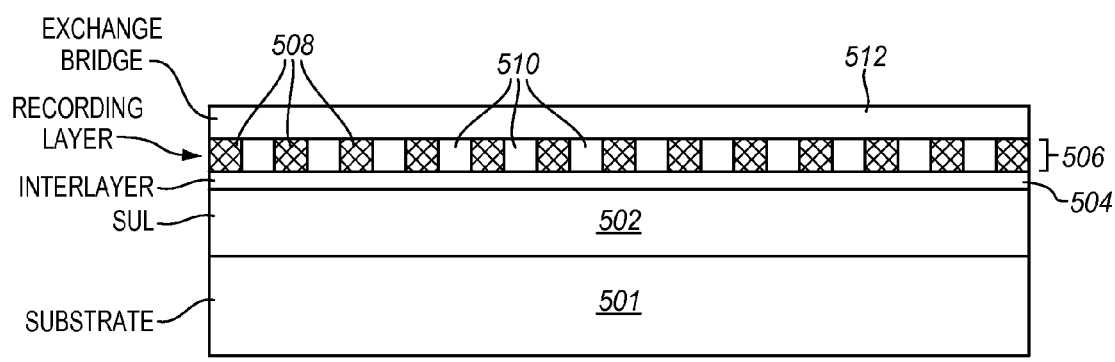
FIG. 5 is a cross-sectional view of a patterned magnetic recording media with an exchange bridge structure fabricated on top of islands in another exemplary embodiment of the invention.
Figure 6:
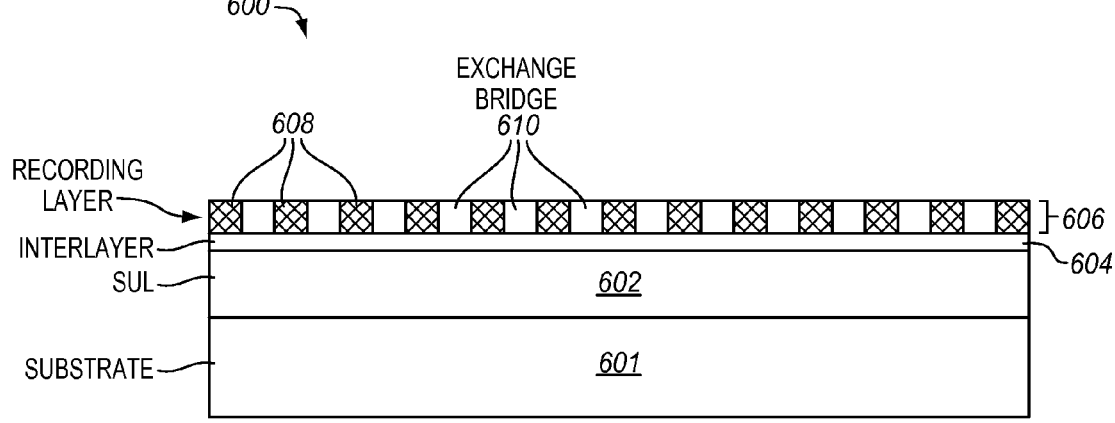
FIG. 6 is a cross-sectional view of a patterned magnetic recording media with an exchange bridge structure fabricated between islands in another exemplary embodiment of the invention.

FIG. 5 is a cross-sectional view of a patterned magnetic recording media 500 with an exchange bridge structure fabricated on top of the islands in another exemplary embodiment of the invention. Patterned magnetic recording media 500 includes a SUL 502 formed on a substrate 501, with an interlayer 504 formed on SUL 502. Patterned magnetic recording media 500 further includes a perpendicular magnetic recording layer 506 formed on interlayer 504. Patterned magnetic recording layer 506 is patterned into a plurality of islands 508. Refill material 510 is deposited between islands 508 in order to create a planarized surface. Patterned magnetic recording media 500 further includes an exchange bridge structure 512 formed on patterned magnetic recording layer 506. Because exchange bridge structure 406 is formed on patterned magnetic recording layer 506, the top of islands 508 are connected to one another with magnetic material.

FIG. 6 is a cross-sectional view of a patterned magnetic recording media 600 with an exchange bridge structure fabricated between the islands in another exemplary embodiment of the invention. Patterned magnetic recording media 600 includes a SUL 602 formed on a substrate 601, with an interlayer 604 formed on SUL 602. Patterned magnetic recording media 600 further includes a perpendicular magnetic recording layer 606 formed on interlayer 604. Patterned magnetic recording layer 606 is patterned into a plurality of islands 608. Patterned magnetic recording media 600 further includes an exchange bridge structure 610 formed between islands 608 of patterned magnetic recording layer 606.

Figure 7:
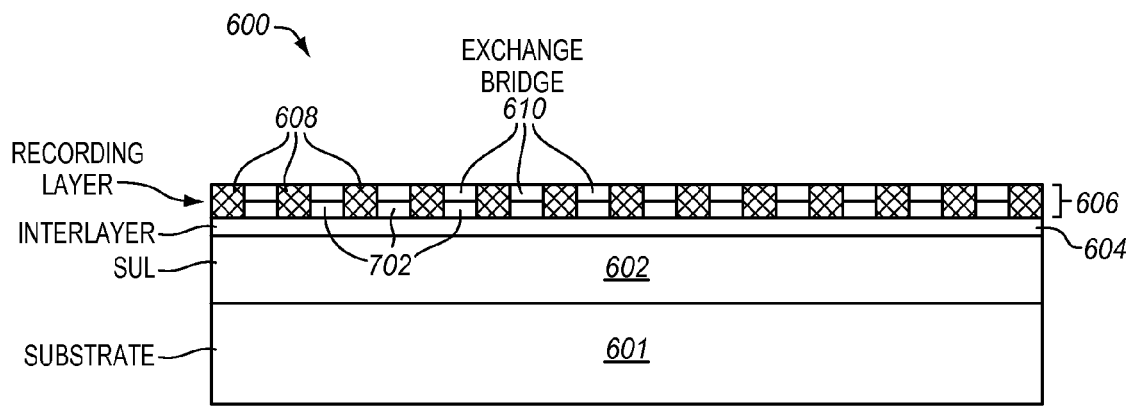
FIG. 7 is a cross-sectional view of a patterned magnetic recording media with an exchange bridge structure only partially filling the spaces between islands in an exemplary embodiment of the invention.

Patterned magnetic recording media 600 as illustrated in FIG. 6 shows exchange bridge structure 610 completely filling the spaces between islands 608. However, exchange bridge structure 610 may only partially fill the spaces between islands 608 in other embodiments. FIG. 7 is a cross-sectional view of a patterned magnetic recording media 600 with exchange bridge structure 610 only partially filling the spaces between islands 608. A non-magnetic material 702 is deposited between islands 608, and exchange bridge structure 610 is deposited on top of non-magnetic material 702. In other embodiments, exchange bridge structure 610 may be deposited first with non-magnetic material 702 deposited on top of exchange bridge structure 610.

Patterned magnetic recording media as described herein may be fabricated in a variety of ways. Three examples are shown in FIGS. 8-34, but those skilled in the art will appreciate that many variations of these fabrication methods may be employed.

Figure 8:
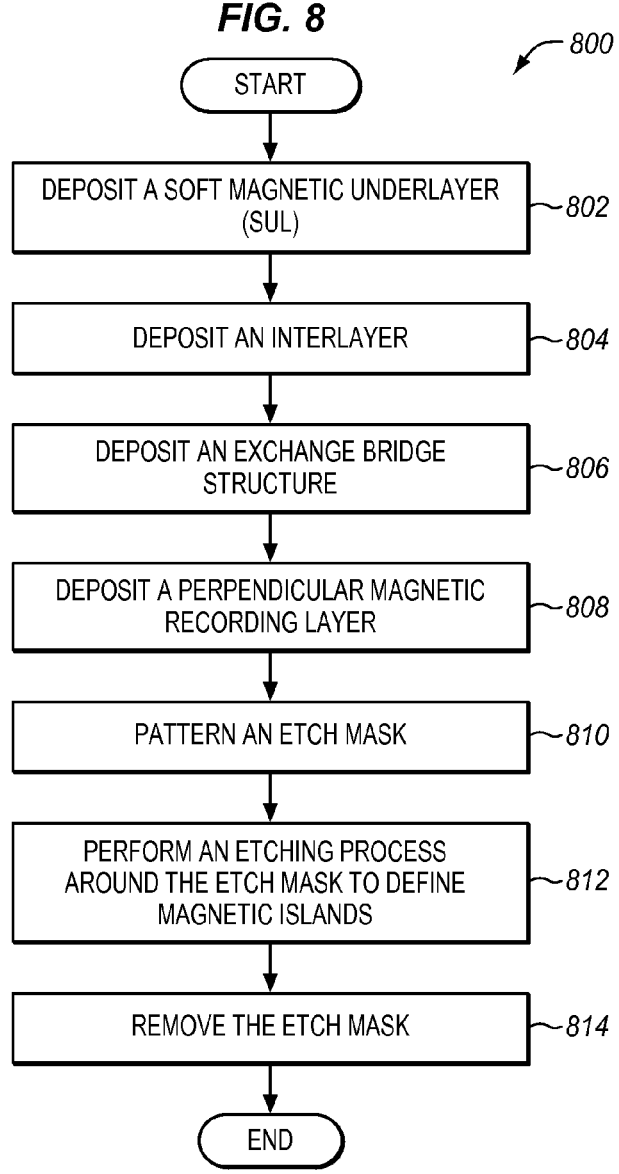
FIG. 8 is a flow chart illustrating a method of fabricating a patterned magnetic recording media in an exemplary embodiment of the invention.

FIG. 8 is a flow chart illustrating a method 800 of fabricating a patterned magnetic recording media in an exemplary embodiment of the invention. FIGS. 9-15 illustrate a patterned magnetic recording media 900 being fabricated according to method 800.

Figure 9:
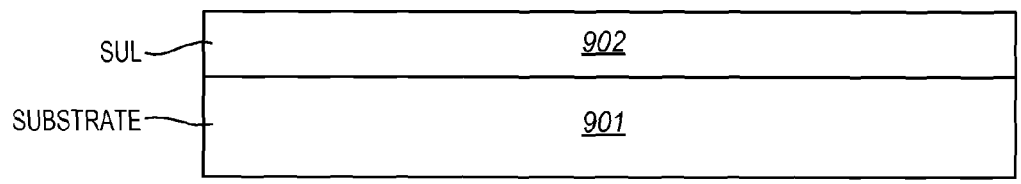
FIG. 9 is a cross-sectional view of a patterned magnetic recording media with an SUL deposited in an exemplary embodiment of the invention.
Figure 10:
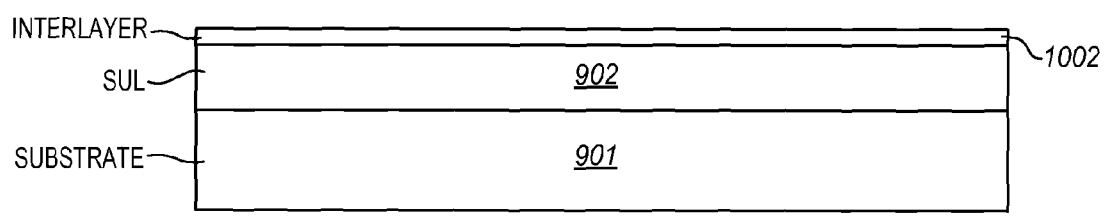
FIG. 10 is a cross-sectional view of patterned a magnetic recording media with an interlayer deposited in an exemplary embodiment of the invention.

Step 802 comprises depositing a SUL 902 on a substrate 901 (see FIG. 9). FIG. 9 is a cross-sectional view of patterned magnetic recording media 900 with SUL 902 deposited according to step 802. As previously mentioned, SUL 902 may comprise a single layer structure or an AP coupled structure. Step 804 comprises depositing an interlayer 1002 on SUL 902 (see FIG. 10). FIG. 10 is a cross-sectional view of patterned magnetic recording media 900 with interlayer 1002 deposited according to step 804. The material for interlayer 1002 may comprise NiCr, NiWCr, or a similar alloy.

Figure 11:
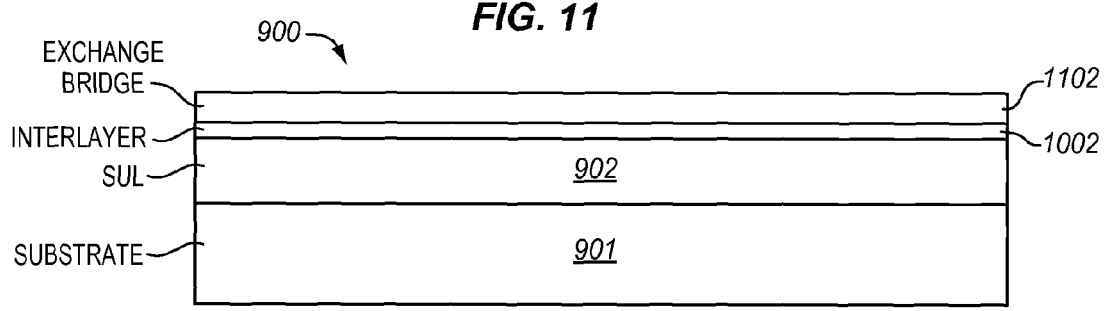
FIG. 11 is a cross-sectional view of a patterned magnetic recording media with an exchange bridge structure deposited in an exemplary embodiment of the invention.

Step 806 comprises depositing an exchange bridge structure 1102 on interlayer 1002 (see FIG. 11). FIG. 11 is a cross-sectional view of patterned magnetic recording media 900 with exchange bridge structure 1102 deposited according to step 806. Exchange bridge structure 1102 may be deposited in a variety of ways. In one example, exchange bridge structure 1102 may be deposited by depositing an exchange bridge layer of magnetic material, such as Permalloy, Co-alloys, or soft ferromagnetic materials. In another example, exchange bridge structure 1102 may be deposited by depositing an exchange bridge layer of magnetic material, and then depositing an exchange control layer of non-magnetic material, such as Ru, Pt, C, Pd, Si, SiOx, SiNx, Cu, Ta, Au, Ag, Mg, MgOx, Ti, TiOx, Cr, etc, or of attenuated magnetic materials by forming mixtures of aforementioned materials with addition of one or more of the magnetic elements such as Co, Fe, and Ni. The exchange control layer controls the amount of exchange coupling between subsequently-formed islands of a perpendicular magnetic recording layer and the exchange bridge layer.

Figure 12:
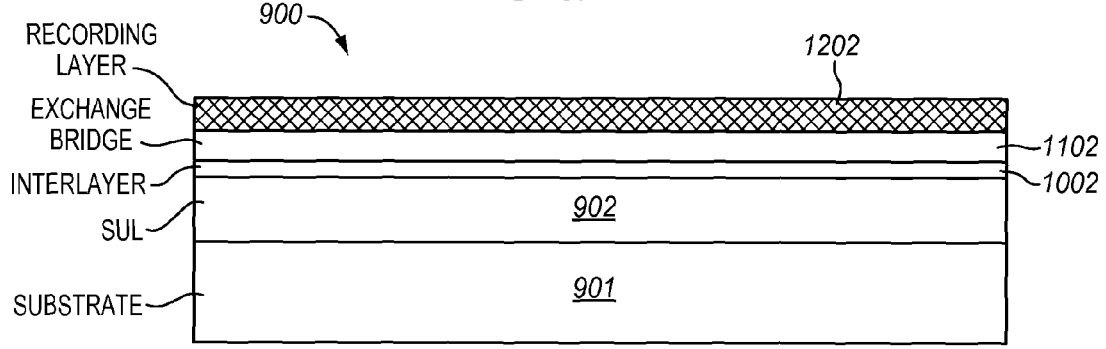
FIG. 12 is a cross-sectional view of a patterned magnetic recording media with a perpendicular magnetic recording layer deposited in an exemplary embodiment of the invention.

Step 808 comprises depositing a perpendicular magnetic recording layer 1202 on exchange bridge structure 1102 (see FIG. 12). FIG. 12 is a cross-sectional view of patterned magnetic recording media 900 with perpendicular magnetic recording layer 1202 deposited according to step 808. The material for the perpendicular magnetic recording layer 1202 may comprise CoPtCr—SiOx or other similar materials or multilayers of Co, Fe, Pt, Pd, or similar materials.

Figure 13:
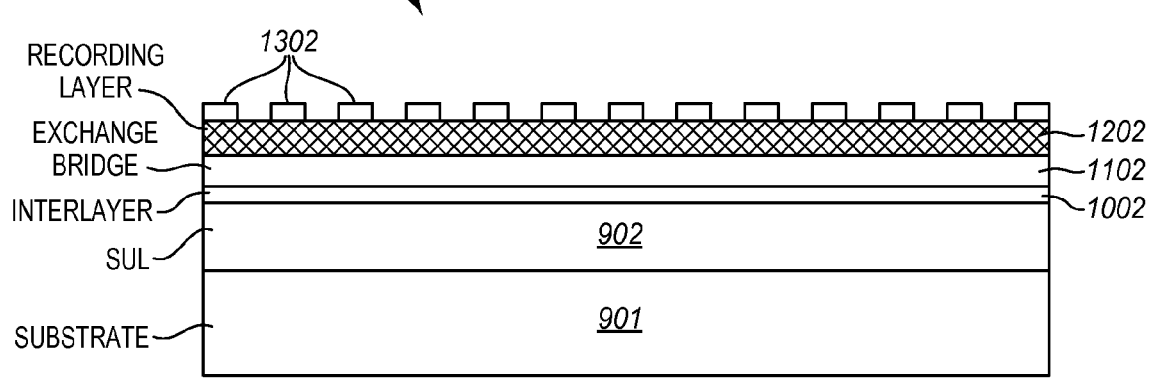
FIG. 13 is a cross-sectional view of a patterned magnetic recording media with an etch mask patterned in an exemplary embodiment of the invention.
Figure 14:
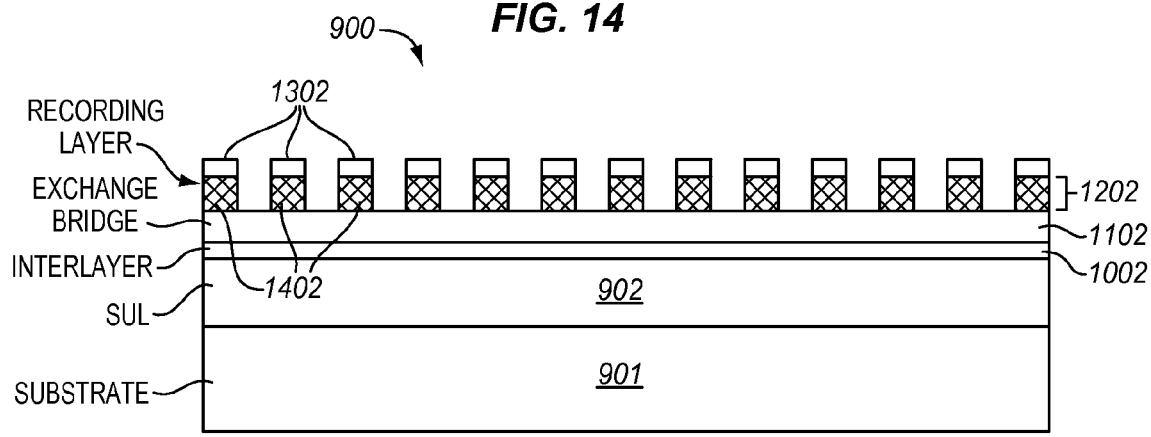
FIG. 14 is a cross-sectional view of a patterned magnetic recording media after the etching process in an exemplary embodiment of the invention.

Step 810 comprises patterning an etch mask 1302 on perpendicular magnetic recording layer 1202 (see FIG. 13). FIG. 13 is a cross-sectional view of patterned magnetic recording media 900 with etch mask 1302 patterned according to step 810. Step 812 comprises performing an etching process, such as ion beam etching, to remove the portions of perpendicular magnetic recording layer 1202 exposed by etch mask 1302 (see FIG. 14). FIG. 14 is a cross-sectional view of patterned magnetic recording media 900 after the etching process according to step 812. The etching process of step 812 defines discrete magnetic islands 1402 out of perpendicular magnetic recording layer 1202.

Figure 15:
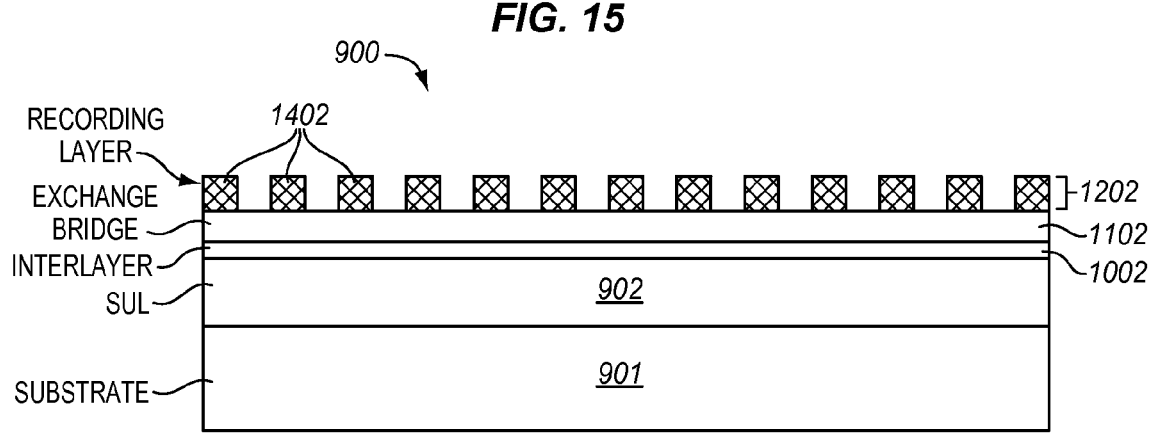
FIG. 15 is a cross-sectional view of a patterned magnetic recording media with an etch mask removed in an exemplary embodiment of the invention.

Step 814 comprises removing etch mask 1302 (see FIG. 15). FIG. 15 is a cross-sectional view of patterned magnetic recording media 900 with etch mask 1302 removed according to step 814. At this point, refill material may be deposited to fill in the spaces between islands 1402, and the top surface planarized to create a flat surface for the recording head to fly over. An overcoat layer may then be deposited to protect islands 1402. Method 800 fabricates a patterned magnetic recording media 900 much as is illustrated in FIG. 4, with exchange bridge structure 1102 fabricated underneath islands 1402. Exchange bridge structure 1102 thus creates exchange coupling between islands 1402.

One variation of method 800 is to remove interlayer 1002, and allow SUL 902 to act as the exchange bridge structure. The SUL 902 may then serve as the magnetic layer that creates exchange coupling between islands 1402. These embodiments are described in FIGS. 36-37.

Figure 16:
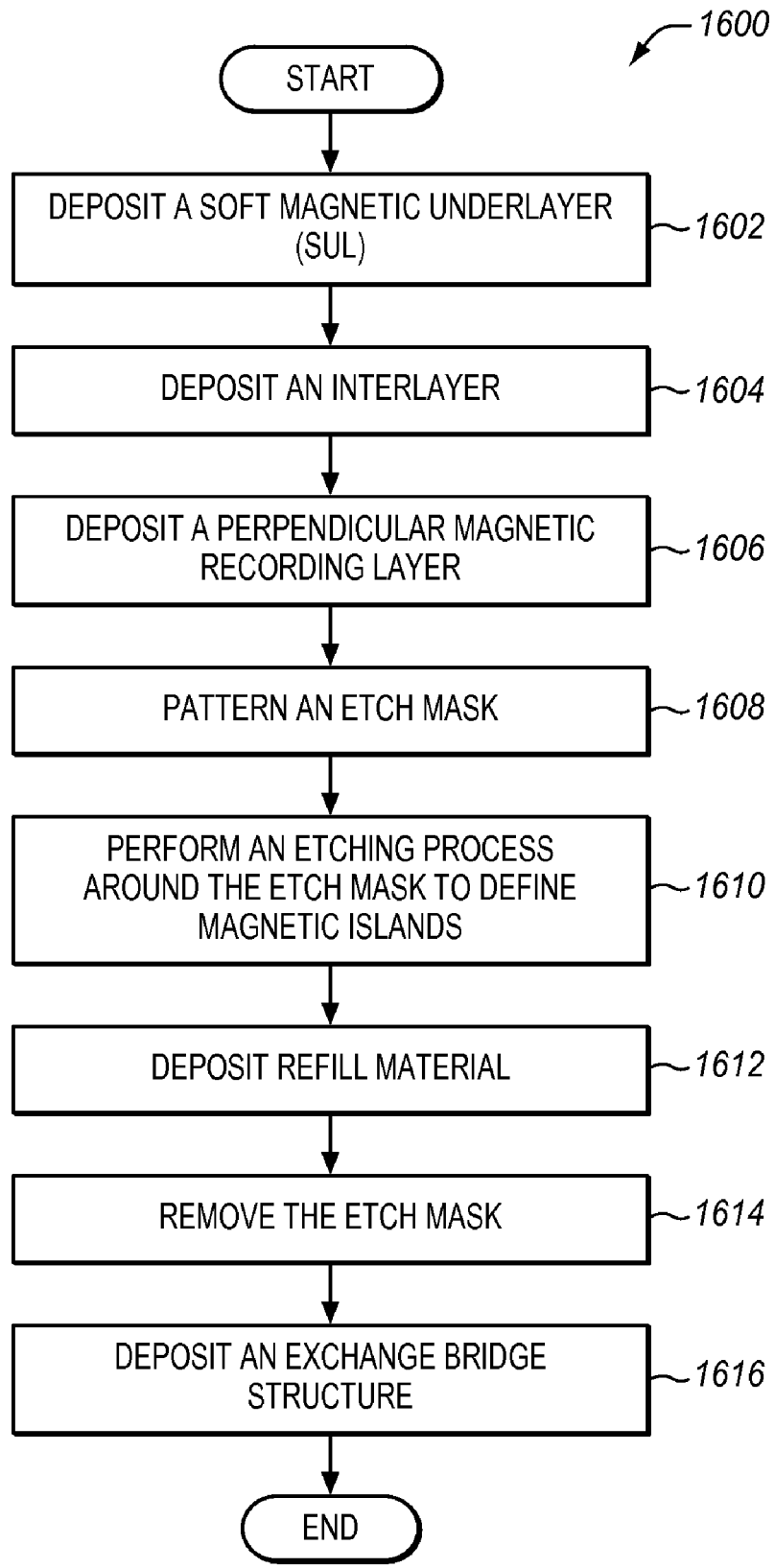
FIG. 16 is a flow chart illustrating another method of fabricating a patterned magnetic recording media in an exemplary embodiment of the invention.

FIG. 16 is a flow chart illustrating another method 1600 of fabricating a patterned magnetic recording media in an exemplary embodiment of the invention. FIGS. 17-24 illustrate a patterned magnetic recording media 1700 being fabricated according to method 1600.

Figure 17:
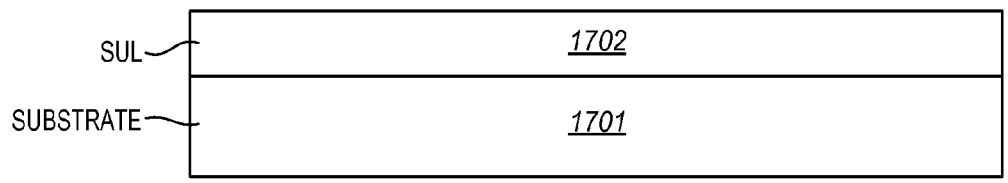
FIG. 17 is a cross-sectional view of a patterned magnetic recording media with an SUL deposited in an exemplary embodiment of the invention.
Figure 18:
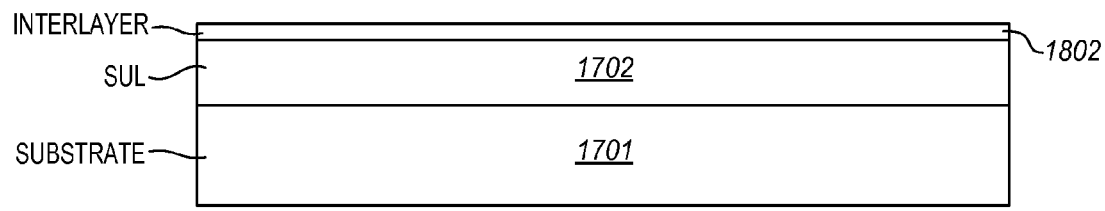
FIG. 18 is a cross-sectional view of a patterned magnetic recording media with an interlayer deposited in an exemplary embodiment of the invention.

Step 1602 comprises depositing a SUL 1702 on a substrate 1701 (see FIG. 17). FIG. 17 is a cross-sectional view of patterned magnetic recording media 1700 with SUL 1702 deposited according to step 1602. Step 1604 comprises depositing an interlayer 1802 on SUL 1702 (see FIG. 18). FIG. 18 is a cross-sectional view of patterned magnetic recording media 1700 with interlayer 1802 deposited according to step 1604.

Figure 19:
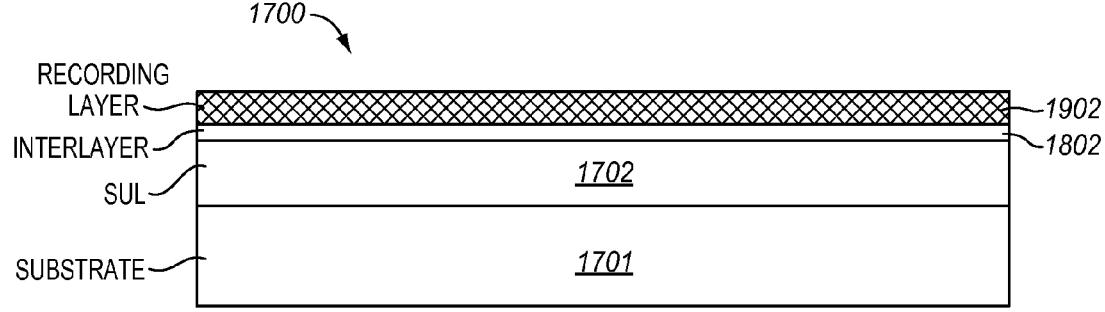
FIG. 19 is a cross-sectional view of a patterned magnetic recording media with a perpendicular magnetic recording layer deposited in an exemplary embodiment of the invention.
Figure 20:
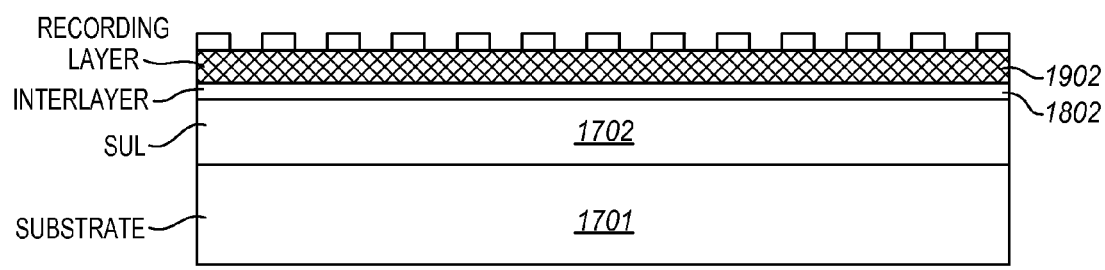
FIG. 20 is a cross-sectional view of a patterned magnetic recording media with an etch mask patterned in an exemplary embodiment of the invention.

Step 1606 comprises depositing a perpendicular magnetic recording layer 1902 on interlayer 1802 (see FIG. 19). FIG. 19 is a cross-sectional view of patterned magnetic recording media 1700 with perpendicular magnetic recording layer 1902 deposited according to step 1606. Step 1608 comprises patterning an etch mask 2002 on perpendicular magnetic recording layer 1902 (see FIG. 20). FIG. 20 is a cross-sectional view of patterned magnetic recording media 1700 with etch mask 2002 patterned according to step 1608. Step 1610 comprises performing an etching process to remove the portions of perpendicular magnetic recording layer 1902 exposed by etch mask 2002 (see FIG. 21). FIG. 21 is a cross-sectional view of patterned magnetic recording media 1700 after the etching process according to step 1610. The etching process of step 1610 defines discrete magnetic islands 2102 out of perpendicular magnetic recording layer 1902. Step 1612 comprises depositing refill material 2202 (see FIG. 22). FIG. 22 is a cross-sectional view of patterned magnetic recording media 1700 with refill material 2202 deposited according to step 1612. Refill material 2202 is used to fill the spaces between islands 2102. Refill material 2202 may comprise alumina or some other non-magnetic material. Step 1614 comprises removing etch mask 2002 (see FIG. 23). FIG. 23 is a cross-sectional view of patterned magnetic recording media 1700 with etch mask 2002 removed according to step 1614. At this point, the top surface of patterned magnetic recording media 1700 may be planarized, or may be left slightly uneven from the previous processes.

Figure 24:
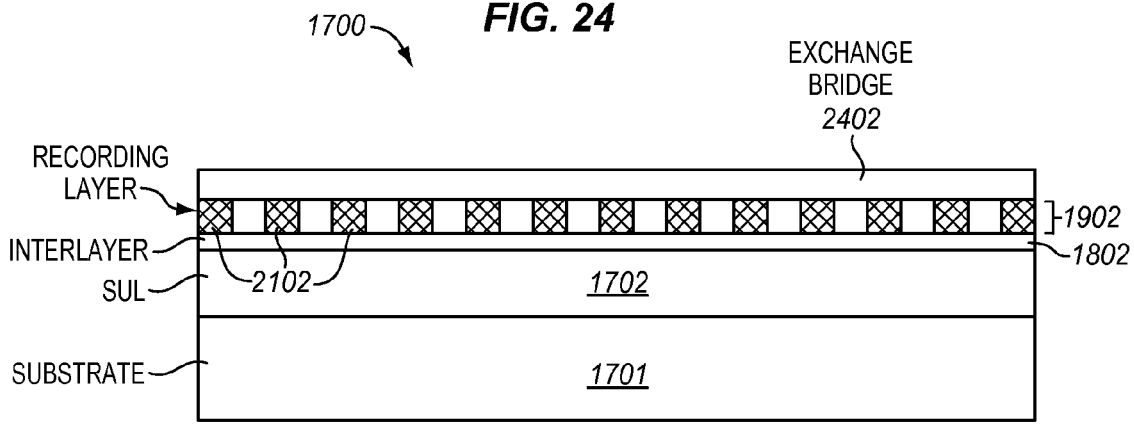
FIG. 24 is a cross-sectional view of a patterned magnetic recording media with an exchange bridge structure deposited in an exemplary embodiment of the invention.

Step 1616 comprises depositing an exchange bridge structure 2402 on the top surface of patterned magnetic recording media 1700 (see FIG. 24). FIG. 24 is a cross-sectional view of patterned magnetic recording media 1700 with exchange bridge structure 2402 deposited according to step 1616. Exchange bridge structure 2402 is in contact with the top surfaces of islands 2102. An overcoat layer may then be deposited to protect exchange bridge structure 2402.

In the embodiment described in FIG. 16, perpendicular magnetic recording layer 1902 was etched to form islands 2102. However, those skilled in the art will appreciate that there are different ways of forming islands 2102. For example, substrate material may be deposited in the place of perpendicular magnetic recording layer 1902, and then patterned as described above. A perpendicular magnetic recording layer may then be deposited on top of the islands formed out of the substrate material. After the perpendicular magnetic recording layer and the refill material 2202 is deposited, exchange bridge structure 2402 may then be deposited.

Figure 25:
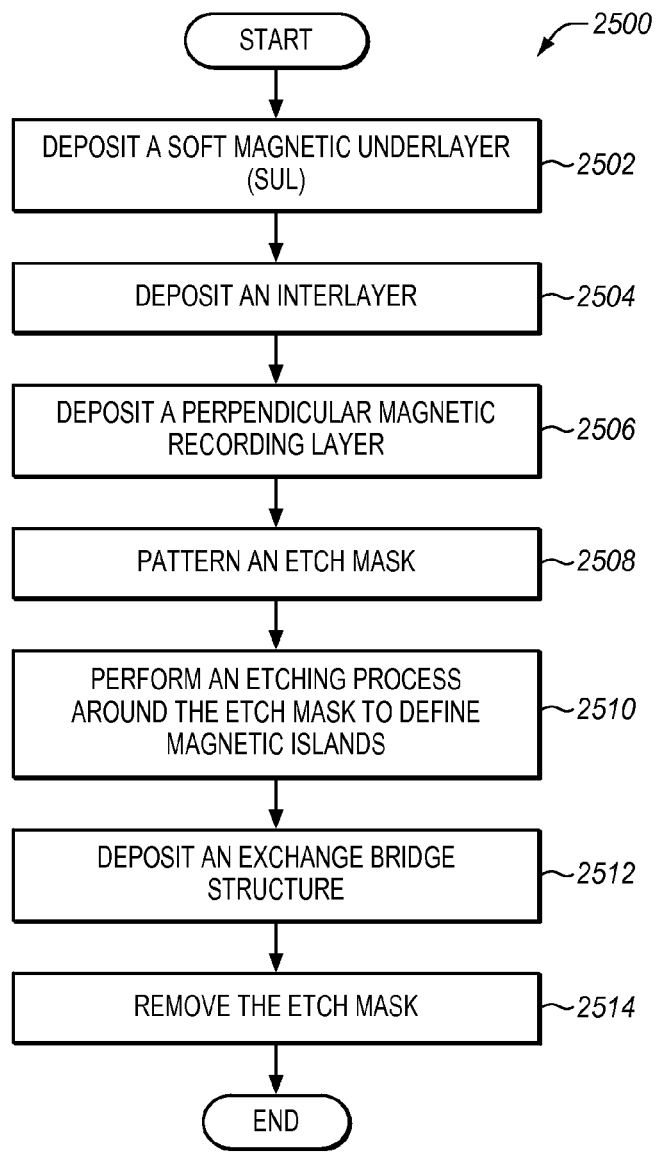
FIG. 25 is a flow chart illustrating another method of fabricating a patterned magnetic recording media in an exemplary embodiment of the invention.

FIG. 25 is a flow chart illustrating another method 2500 of fabricating a patterned magnetic recording media in an exemplary embodiment of the invention. FIGS. 26-34 illustrate a patterned magnetic recording media 2600 being fabricated according to method 2500.

Figure 26:
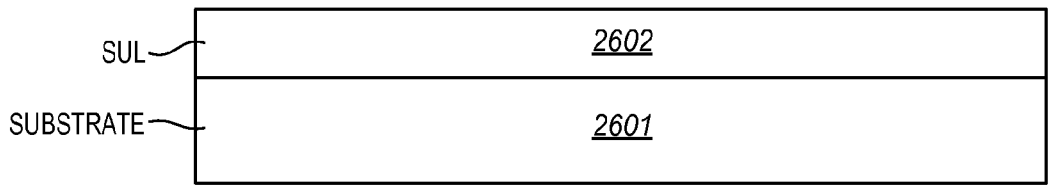
FIG. 26 is a cross-sectional view of a patterned magnetic recording media with an SUL deposited in an exemplary embodiment of the invention.
Figure 27:
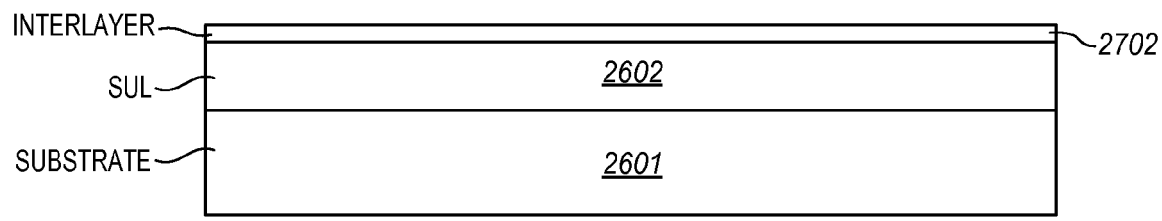
FIG. 27 is a cross-sectional view of a patterned magnetic recording media with an interlayer deposited in an exemplary embodiment of the invention.

Step 2502 comprises depositing a SUL 2602 on a substrate 2601 (see FIG. 26). FIG. 26 is a cross-sectional view of patterned magnetic recording media 2600 with SUL 2602 deposited according to step 2502. Step 2504 comprises depositing an interlayer 2702 on SUL 2602 (see FIG. 27). FIG. 27 is a cross-sectional view of patterned magnetic recording media 2600 with interlayer 2702 deposited according to step 2504.

Figure 28:
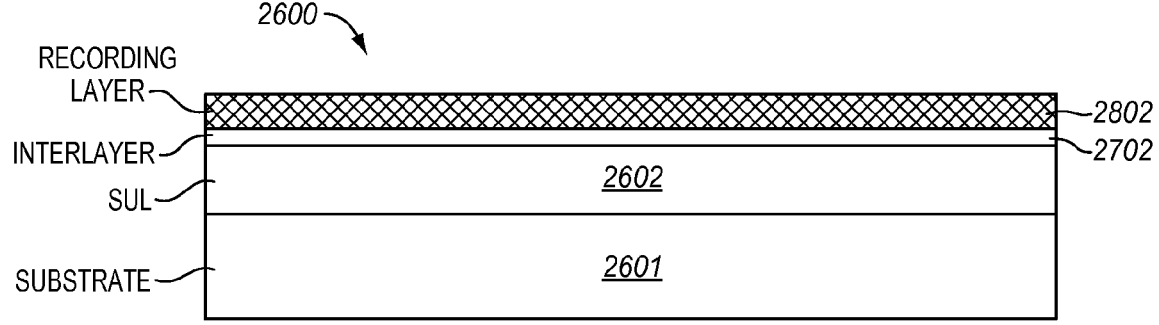
FIG. 28 is a cross-sectional view of a patterned magnetic recording media with a perpendicular magnetic recording layer deposited in an exemplary embodiment of the invention.
Figure 29:
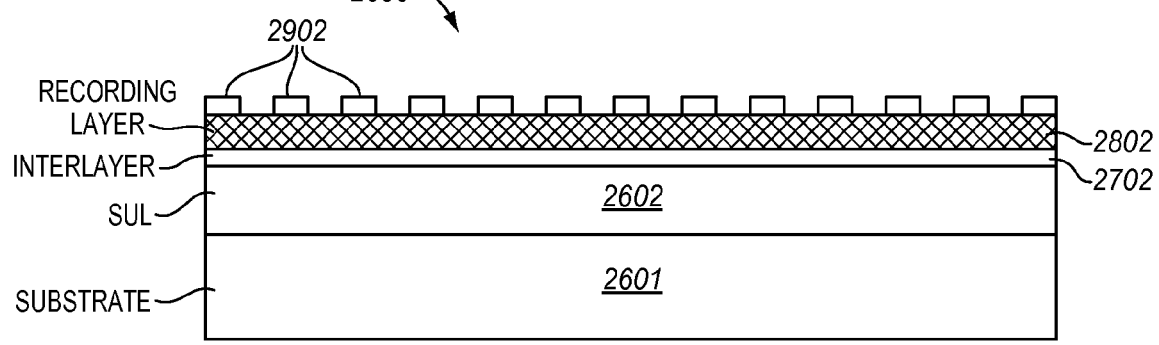
FIG. 29 is a cross-sectional view of a patterned magnetic recording media with an etch mask patterned in an exemplary embodiment of the invention.
Figure 30:
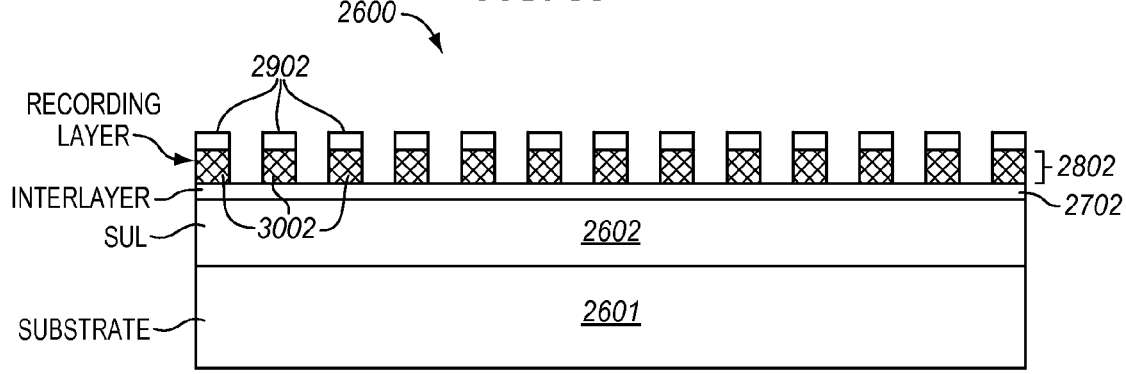
FIG. 30 is a cross-sectional view of a patterned magnetic recording media after an etching process in an exemplary embodiment of the invention.

Step 2506 comprises depositing a perpendicular magnetic recording layer 2802 on interlayer 2702 (see FIG. 28). FIG. 28 is a cross-sectional view of patterned magnetic recording media 2600 with perpendicular magnetic recording layer 2802 deposited according to step 2506. Step 2508 comprises patterning an etch mask 2902 on perpendicular magnetic recording layer 2802 (see FIG. 29). FIG. 29 is a cross-sectional view of patterned magnetic recording media 2600 with etch mask 2902 patterned according to step 2508. Step 2510 comprises performing an etching process to remove the portions of perpendicular magnetic recording layer 2802 exposed by etch mask 2902 (see FIG. 30). FIG. 30 is a cross-sectional view of patterned magnetic recording media 2600 after the etching process according to step 2510. The etching process of step 2510 defines discrete magnetic islands 3002 out of perpendicular magnetic recording layer 2802.

Figure 31:
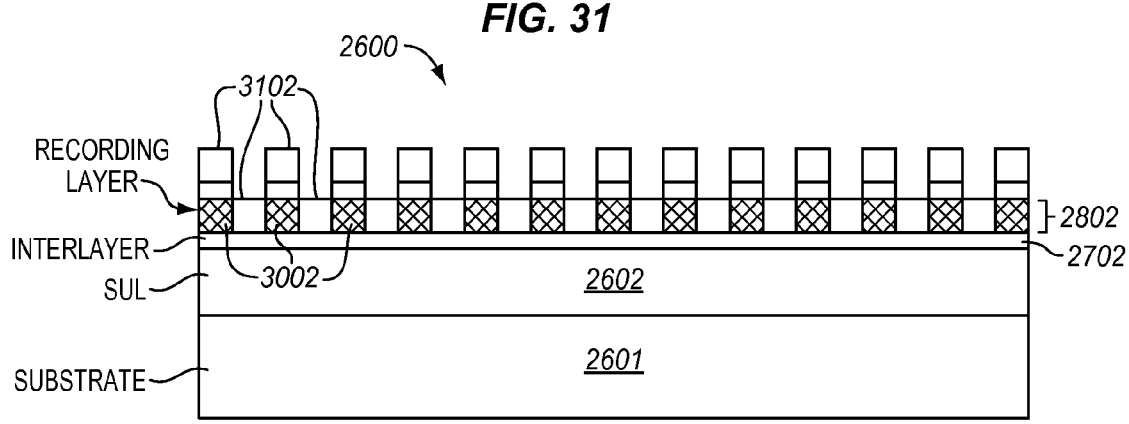
FIG. 31 is a cross-sectional view of a patterned magnetic recording media with an exchange bridge structure deposited in an exemplary embodiment of the invention.

Step 2512 comprises depositing an exchange bridge structure 3102 (see FIG. 31). FIG. 31 is a cross-sectional view of patterned magnetic recording media 2600 with exchange bridge structure 3102 deposited according to step 2512. Exchange bridge structure 3102 is deposited between islands 3002 and contacts the sides of islands 3002.

Figure 32:
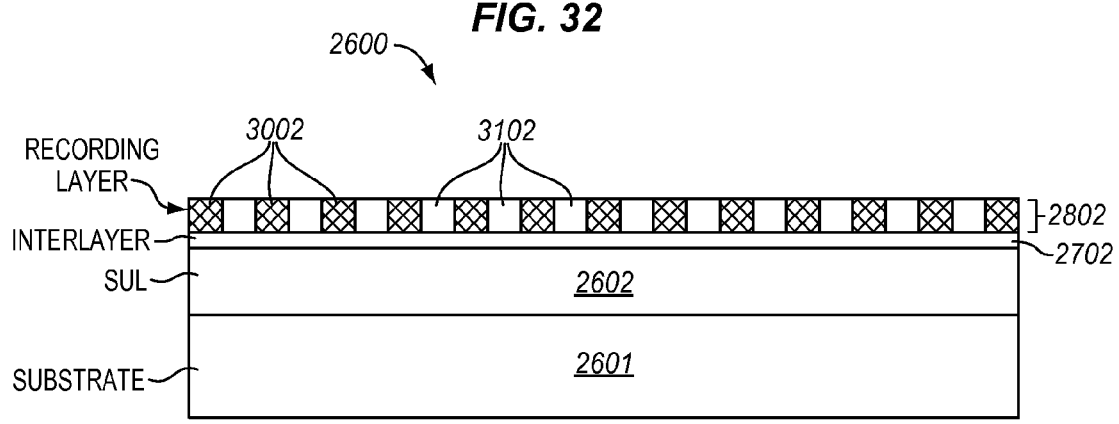
FIG. 32 is a cross-sectional view of a patterned magnetic recording media with an etch mask removed in an exemplary embodiment of the invention.

Step 2514 comprises removing etch mask 2902 (see FIG. 32). FIG. 32 is a cross-sectional view of patterned magnetic recording media 2600 with etch mask 2902 removed according to step 2514. At this point, the top surface of patterned magnetic recording media 2600 may be planarized, or may be left slightly uneven from the previous processes. An overcoat layer may then be deposited to protect islands 3002 and exchange bridge structure 3102.

Figure 33:
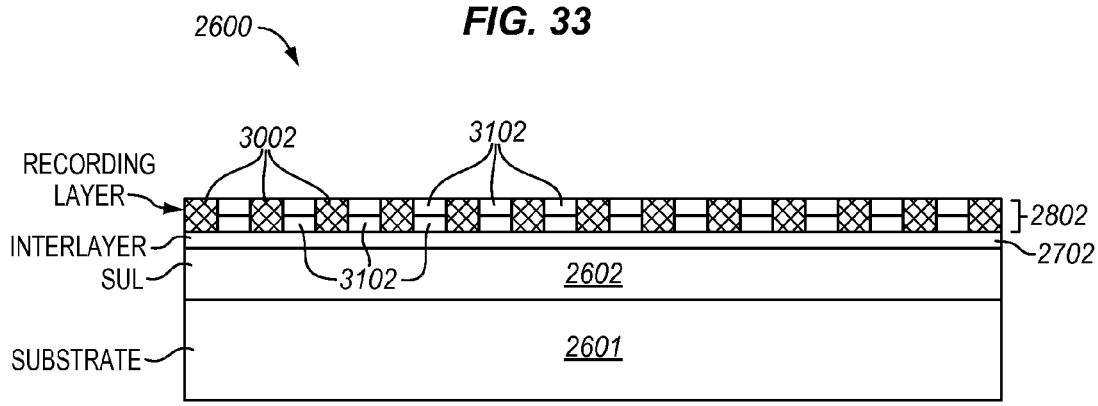
FIG. 33 illustrates a patterned magnetic recording media with refill material deposited before an exchange bridge structure in an exemplary embodiment of the invention.
Figure 34:
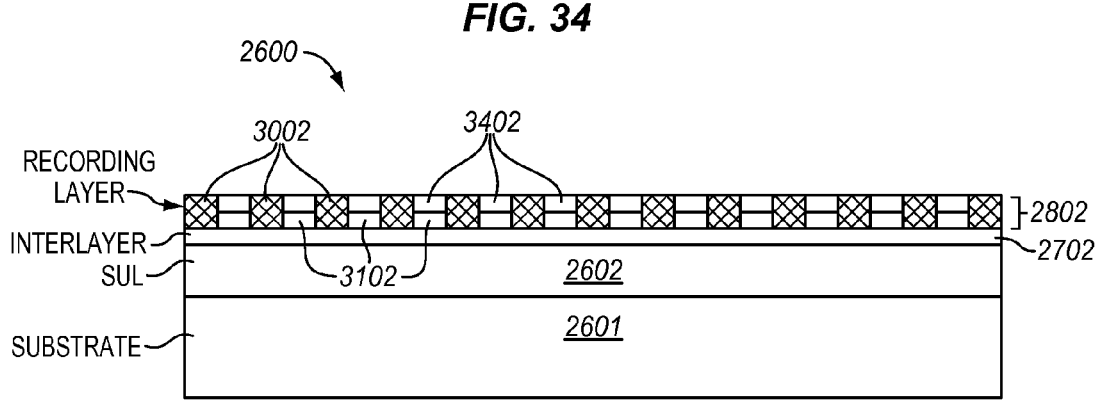
FIG. 34 illustrates a patterned magnetic recording media with refill material deposited after an exchange bridge structure in an exemplary embodiment of the invention.

FIG. 32 illustrates the exchange bridge structure 3102 having a thickness equal to islands 3002. If exchange coupling between islands 3002 is too strong to allow islands 3002 to switch independently from one another, then a composite material for exchange bridge structure 3102 may be used. For instance, there may be microscopic regions of magnetic material interspersed among regions of non-magnetic material. Strong exchange coupling may alternatively be reduced by adjusting the thickness of exchange bridge structure 3102 as shown in FIGS. 33-34. The spaces between islands 3002 may be filled with refill material (i.e., a non-magnetic material) and exchange bridge structure 3102 to adjust the thickness of exchange bridge structure 3102. FIG. 33 illustrates patterned magnetic recording media 2600 with refill material 3302 deposited before exchange bridge structure 3102. In this example, the exchange bridge structure 3102 is thinner than in FIG. 32 and contacts the top portions of islands 3002. FIG. 34 illustrates patterned magnetic recording media 2600 with refill material 3402 deposited after exchange bridge structure

3102. In this example, the exchange bridge structure 3102 is again thinner than in FIG. 32 and contacts the bottom portions of islands 3002.

The exchange bridge structure in the above embodiments may be fabricated in a variety of ways. In one example, the exchange bridge structure may be fabricated as a layer of magnetic material, such as Permalloy, Co-alloys, or soft ferromagnetic materials. In another example, the exchange bridge structure may be a multi-layer structure of non-magnetic material and magnetic material. In another example, the exchange bridge may include attenuated magnetic materials formed from mixtures of non-magnetic material, including Ru, Pt, C, Pd, Si, SiOx, SiNx, Cu, Ta, Au, Ag, Mg, MgOx, Ti, TiOx, Cr, etc, and one or more of the magnetic elements such as Co, Fe, and Ni.

Figure 35:
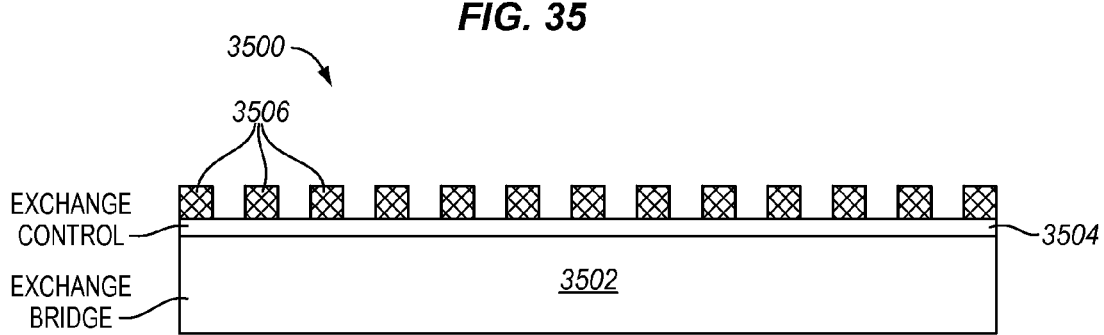
FIG. 35 illustrates a multi-layer exchange bridge structure in an exemplary embodiment of the invention.

FIG. 35 illustrates a multi-layer exchange bridge structure 3500 in an exemplary embodiment of the invention. Multi-layer exchange bridge structure 3500 includes an exchange bridge layer 3502 of magnetic material, such as Permalloy, Co-alloys, or soft ferromagnetic materials. The thickness of the exchange bridge layer 3502, in one example, is between about 0.3-12 nanometers, depending on the material used and what type of exchange control layer, if any, is used. A high thickness of the exchange bridge layer 3502 is achieved with attenuated magnetic materials where magnetic materials are attenuated by the addition of non-magnetic materials including Ru, Pt, C, Pd, Si, SiOx, SiNx, Cu, Ta, Au, Ag, Mg, MgOx, Ti, TiOx, Cr, etc. Thinner thickness of the exchange bridge layer 3502 is achieved by adding less, if any, of the non-magnetic materials to the magnetic materials.

Multi-layer exchange bridge structure 3500 further includes an exchange control layer 3504 of non-magnetic material, such as Ru, Pt, C, Pd, Si, SiOx, SiNx, Cu, Ta, Au, Ag, Mg, MgOx, Ti, TiOx, Cr, etc, or of attenuated magnetic materials by forming mixtures of aforementioned materials with addition of one or more of the magnetic elements such as Co, Fe, and Ni. Islands 3506 of a perpendicular magnetic recording layer are illustrated as being patterned on Lop of exchange control layer 3504. Exchange control layer 3504 controls the amount of exchange coupling between islands 3506 of a perpendicular magnetic recording layer and exchange bridge layer 3502. Exchange control layer 3504 is sufficiently thin to allow some exchange coupling to be mediated. An exemplary thickness of exchange control layer 3504 is between about 0.5-2 nanometers, depending on the material used. A low thickness of exchange control layer 3504 may be achieved with non-magnetic materials or highly-attenuated magnetic materials with small addition of the magnetic elements to the non-magnetic materials. Larger thickness of exchange control layer 3504 may be achieved by adding more of the magnetic elements to the non-magnetic materials.

In FIG. 35, exchange control layer 3504 is illustrated as deposited on top of exchange bridge layer 3502. Such a configuration may be used in the method of FIG. 8. Exchange control layer 3504 is used to separate exchange bridge layer 3502 from the islands 3506 of the perpendicular magnetic recording layer. Thus, exchange bridge layer 3502 may be deposited on top of exchange control layer 3504 in other embodiments if exchange bridge structure 3500 is fabricated on top of the islands.

Figure 36:
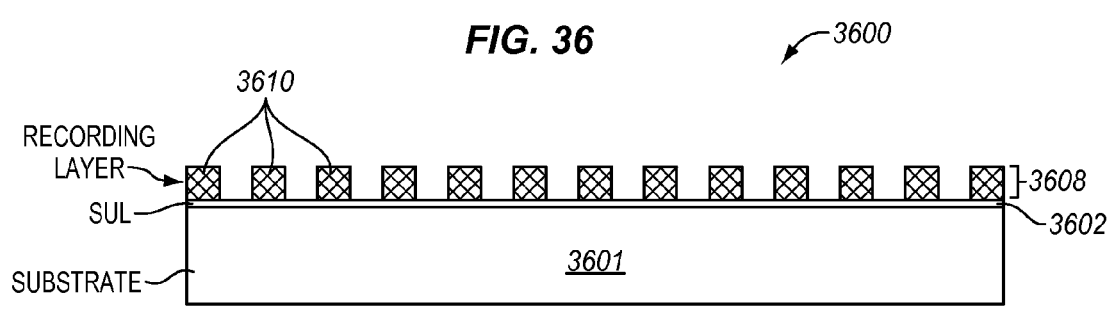
FIG. 36 is a cross-sectional view of a patterned magnetic recording media with islands fabricated on a SUL in an exemplary embodiment of the invention.
Figure 37:
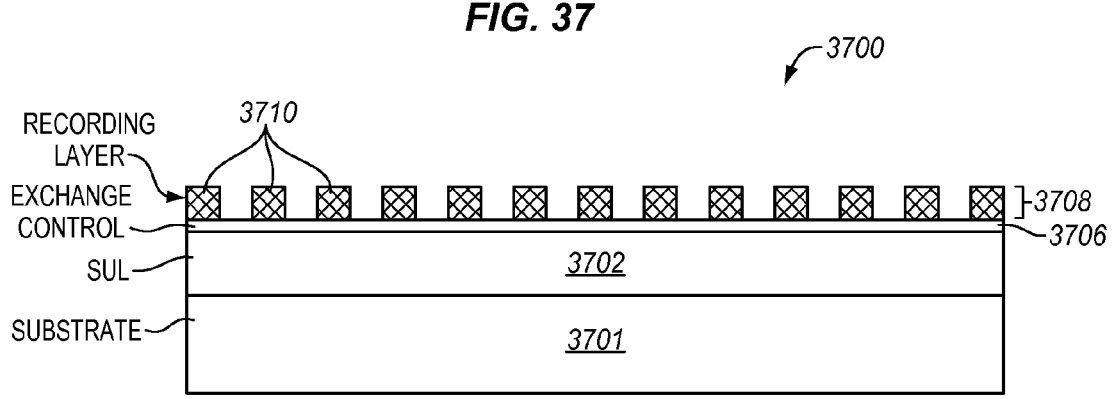
FIG. 37 is a cross-sectional view of a patterned magnetic recording media with islands fabricated on an exchange control layer in an exemplary embodiment of the invention.

As previously mentioned, the SUL may act as the exchange bridge layer is some embodiments, which is illustrated in FIGS. 36-37. FIG. 36 is a cross-sectional view of a patterned magnetic recording media 3600 with islands fabricated on a SUL in an exemplary embodiment of the invention. Patterned magnetic recording media 3600 includes a soft magnetic underlayer (SUL) 3602 formed on a substrate 3601, with a perpendicular magnetic recording layer 3608 formed on SUL 3602. Patterned magnetic recording layer 3608 is patterned into a plurality of islands 3610. Because islands 3610 are formed on SUL 3602, the bottoms of islands 3610 are connected to one another with magnetic material. SUL 3602 in this embodiment acts as an exchange bridge layer to provide exchange coupling between islands 3610.

In order to avoid excessive coupling between the islands 3610 in this embodiment, a thinner SUL 3602 or a SUL 3602 with a lower permeability is used. A typical SUL is between about 20-50 nanometers thick. A thinner or lower permeability SUL may be used when a write element, which is used to write to the media, is less reliant on flux conductance through the SUL. An example of a thinner SUL is about 2-5 nanometers. When a thinner SUL 3602 or a SUL 3602 having a lower permeability is used in the media, the islands 3610 may be formed directly on SUL 3602, which then acts as the exchange bridge layer.

If a thicker SUL is used, then an exchange control layer may be implemented between the islands and the SUL. FIG. 37 is a cross-sectional view of a patterned magnetic recording media 3700 with islands fabricated on an exchange control layer in an exemplary embodiment of the invention. Patterned magnetic recording media 3700 includes a soft magnetic underlayer (SUL) 3702 formed on a substrate 3701, with an exchange control layer 3706 formed on SUL 3702. Patterned magnetic recording media 3700 also includes a perpendicular magnetic recording layer 3708 formed on exchange control layer 3706. Patterned magnetic recording layer 3708 is patterned into a plurality of islands 3710. Again, SUL 3702 in this embodiment acts as an exchange bridge layer to provide exchange coupling between islands 3710.

Exchange control layer 3706 is formed from non-magnetic material, such as Ru, Pt, C, Pd, Si, SiOx, SiNx, Cu, Ta, Au, Ag, Mg, MgOx, Ti, TiOx, Cr, etc, or of attenuated magnetic materials by forming mixtures of aforementioned materials with addition of one or more of the magnetic elements such as Co, Fe, and Ni. Exchange control layer 3706 controls the amount of exchange coupling between islands 3710 and SUL 3702. Exchange control layer 3706 is sufficiently thin to allow some exchange coupling to be mediated. An exemplary thickness of exchange control layer 3706 is between about 0.5-2 nanometers, depending on the material used. A low thickness of exchange control layer 3706 may be achieved with non-magnetic materials or highly-attenuated magnetic materials with small addition of the magnetic elements to the non-magnetic materials. Larger thickness of exchange control layer 3706 may be achieved by adding more of the magnetic elements to the non-magnetic materials.

Although specific embodiments were described herein, the scope of the invention is not limited to those specific embodiments. The scope of the invention is defined by the following claims and any equivalents thereof.

We claim:

1. A method of fabricating a patterned magnetic recording media, the method comprising:
   depositing a soft magnetic underlayer (SUL) on a substrate;
   depositing an interlayer on the SUL;
   depositing an exchange bridge structure on the interlayer;
   depositing a perpendicular magnetic recording layer on the exchange bridge structure;
   patterning an etch mask on the perpendicular magnetic recording layer;
   performing an etching process to remove the portions of the perpendicular magnetic recording layer exposed by the etch mask to define discrete magnetic islands out of the perpendicular magnetic recording layer; and removing the etch mask;

wherein the exchange bridge structure is formed from magnetic material and connects the bottoms of the islands.

2. The method of claim 1 wherein depositing an exchange bridge structure comprises:

depositing an exchange bridge layer of magnetic material on the interlayer; and depositing an exchange control layer of non-magnetic material on the exchange bridge layer.

3. The method of claim 2 wherein the thickness of the exchange control layer controls the amount of exchange coupling between the exchange bridge layer and the islands.

4. A method of fabricating a patterned magnetic recording media, the method comprising:

depositing a soft magnetic underlayer (SUL) on a substrate;

depositing an interlayer on the SUL;

depositing a perpendicular magnetic recording layer on the interlayer;

patterning an etch mask on the perpendicular magnetic recording layer;

performing an etching process to remove the portions of the perpendicular magnetic recording layer exposed by the etch mask to define discrete magnetic islands out of the perpendicular magnetic recording layer;

depositing an exchange bridge structure between the islands; and removing the etch mask;

wherein the exchange bridge structure is formed from magnetic material and connects the sides of the islands.

5. The method of claim 4 wherein depositing an exchange bridge structure comprises:

depositing an exchange bridge layer of magnetic material that fills the spaces between the islands.

6. The method of claim 4 wherein depositing an exchange bridge structure comprises:

depositing an exchange bridge layer of magnetic material that partially fills the spaces between the islands; and depositing a refill material on the exchange bridge layer to fill the remaining area of the spaces.

7. The method of claim 4 wherein depositing an exchange bridge structure comprises:

depositing a refill material that partially fills the spaces between the islands; and depositing an exchange bridge layer of magnetic material on the refill material to fill the remaining area of the spaces.

* * * * *